US009720129B2

(12) United States Patent
Miles et al.

(10) Patent No.: US 9,720,129 B2
(45) Date of Patent: Aug. 1, 2017

(54) ELECTRONICS FOR A THIN BED ARRAY INDUCTION LOGGING SYSTEM

(71) Applicant: Pico Technologies LLC, Houston, TX (US)

(72) Inventors: Gerald P. Miles, Sugar Land, TX (US); Cesar A. Sarria, Popayan (CO); Jairo A. Mena, San Juan de Pasto (CO); Mostafa M. Ebeid, Houston, TX (US); Tarek AbdelAziz, Katy, TX (US)

(73) Assignee: PICO Technologies LLC, Houston, TX (US)

( * ) Notice: Subject to any disclaimer, the term of this patent is extended or adjusted under 35 U.S.C. 154(b) by 159 days.

(21) Appl. No.: 14/493,965

(22) Filed: Sep. 23, 2014

(65) Prior Publication Data
US 2015/0008928 A1 Jan. 8, 2015

Related U.S. Application Data

(63) Continuation of application No. 13/546,771, filed on Jul. 11, 2012, now Pat. No. 8,854,045.

(51) Int. Cl.
G01V 3/10 (2006.01)
G01V 3/38 (2006.01)
(Continued)

(52) U.S. Cl.
CPC .............. G01V 3/38 (2013.01); E21B 1/00 (2013.01); E21B 3/00 (2013.01); E21B 6/00 (2013.01);
(Continued)

(58) Field of Classification Search
CPC ........ H04L 1/00; H04L 2201/00; H04W 4/00; G01S 1/00; G01S 2205/00; H02J 1/00
See application file for complete search history.

(56) References Cited

U.S. PATENT DOCUMENTS 4,455,529 A 6/1984 Sinclair
4,737,719 A 4/1988 Moore
(Continued)

FOREIGN PATENT DOCUMENTS

CN 1168722 12/1997
CN 1492239 4/2004
(Continued)

OTHER PUBLICATIONS

European Search Report for European Application No. EP13816529 dated Feb. 10, 2016.
(Continued)

Primary Examiner — Jermele M Hollington
Assistant Examiner — Temilade Rhodes-Vivour
(74) Attorney, Agent, or Firm — Tumey L.L.P.

(57) ABSTRACT

A logging tool electronics system is disclosed with noise minimization features and pulse compression signal processing techniques to improve the signal-to-noise ratio of array induction logging tools. The borehole is radiated with a magnetic field produced by a configurable multi-frequency and/or multi-amplitude sine wave signal stimulus section driving a fully differential single transmitter coil. Received signals from multiple mutually balanced fully differential receiver arrays are processed by receiver signal chains using adaptive algorithms under firmware control. The received signals are used to determine the conductivity and resistivity of the formation surrounding the borehole.

18 Claims, 4 Drawing Sheets

(51) Int. Cl.

| | | |
|---|---|---|
| *G01V 3/28* | (2006.01) | |
| *E21B 1/00* | (2006.01) | |
| *E21B 3/00* | (2006.01) | |
| *E21B 6/00* | (2006.01) | |
| *E21B 7/00* | (2006.01) | |
| *E21B 10/00* | (2006.01) | |
| *E21B 11/00* | (2006.01) | |
| *E21B 12/00* | (2006.01) | |
| *E21B 15/00* | (2006.01) | |
| *E21B 43/00* | (2006.01) | |
| *E21B 44/00* | (2006.01) | |
| *H04W 4/00* | (2009.01) | |
| *H02J 1/00* | (2006.01) | |
| *H04L 1/00* | (2006.01) | |

(52) U.S. Cl.
CPC ............... *E21B 7/00* (2013.01); *E21B 10/00* (2013.01); *E21B 11/00* (2013.01); *E21B 12/00* (2013.01); *E21B 15/00* (2013.01); *E21B 43/00* (2013.01); *E21B 44/00* (2013.01); *G01V 3/28* (2013.01); *H02J 1/00* (2013.01); *H04L 1/00* (2013.01); *H04W 4/00* (2013.01)

(56) References Cited

U.S. PATENT DOCUMENTS

| | | | |
|---|---|---|---|
| 5,157,605 A | 10/1992 | Chandler et al. | |
| 5,814,988 A * | 9/1998 | Itskovich | G01V 3/32 324/303 |
| 7,183,771 B2 | 2/2007 | Flanagan | |
| 2001/0050185 A1* | 12/2001 | Calder | E21B 21/001 175/5 |
| 2003/0004647 A1 | 1/2003 | Sinclair | |
| 2003/0100994 A1 | 5/2003 | Strickland et al. | |
| 2003/0229450 A1* | 12/2003 | Strickland | G01V 3/28 702/10 |
| 2005/0154532 A1* | 7/2005 | Close | E21B 47/022 702/6 |
| 2008/0062036 A1* | 3/2008 | Funk | E21B 29/06 342/22 |
| 2010/0135117 A1 | 6/2010 | McRory | |
| 2011/0068796 A1* | 3/2011 | Signorelli | G01V 3/30 324/338 |
| 2011/0221442 A1* | 9/2011 | Maurer | G01V 3/28 324/338 |
| 2012/0250461 A1* | 10/2012 | Millot | H04B 11/00 367/82 |
| 2013/0061899 A1* | 3/2013 | Tosi | G21H 1/103 136/202 |
| 2013/0241561 A1* | 9/2013 | Allen | G01V 3/28 324/338 |

FOREIGN PATENT DOCUMENTS

| | | |
|---|---|---|
| EP | 1875275 | 1/2008 |
| WO | 2006096456 | 9/2006 |

OTHER PUBLICATIONS

EPO Search Report and Written Opinion for European Patent Application No. 13816529.5 dated Jul. 7, 2016.
Chinese Language Office Action for Chinese Application No. 201380043944.0 dated Aug. 7, 2016.
Spanish language office action for Mexican Application No. MC/a/2015/000509 dated May 17, 2016.
International Preliminary Report on Patentability for International Application No. PCT/US2013/049554 dated Dec. 17, 2013.

* cited by examiner

ELECTRONICS FOR A THIN BED ARRAY INDUCTION LOGGING SYSTEM

This is a continuation application of application Ser. No. 13,546,771 filed on Jul. 7, 2012.

BACKGROUND OF INVENTION

1. Field of the Invention

This invention relates to the field of logging of oil, gas and mineral wells. More particularly, improvements relating to real-time signal processing and pulse compression for multi-frequency array induction logging are disclosed.

2. Description of Related Art

Induction logging tools are instruments used in logging operations in boreholes that are drilled into underground rock formations in the search for oil, gas or minerals. These tools measure the electrical conductivity of rock formations to determine the presence and the amount of desired minerals in a potential pay zone. Oil and natural gas cause the rock to have a lower than usual conductivity because these fluids are electrically non-conducting and they displace connate saline water. Induction logging tools ideally provide accurate quantitative measures of the fractional saturation of oil or gas in the pay-zone.

Induction logging tools employ sensor arrays that map the rock conductivity at various radial distances from the borehole, so that the influence of invasion of borehole fluids may be reduced. These tools operate on the principle of induced eddy currents, which are substantially proportional to conductivity, and which may be excited and detected using sensitive coils. Tools that are known in the art use arrays of coils that provide capabilities to sense conductivity to different radial distances from a wellbore.

U.S. Pat. No. 5,157,605 discloses an induction logging method and apparatus for operating an induction sound at a plurality of frequencies simultaneously. A plurality of two-coil receiver arrays are used. U.S. Pat. No. 5,548,219 discloses a system for generating multiple frequencies for heterodyne measurement system for use in logging. U.S. Pat. No. 7,183,771 discloses a device comprising a circuit for injecting a calibration signal into the receivers to obtain measurements free from errors introduced by the receiving elements of the system.

Despite many advances in induction logging tool technology, several electronics-related problems remain to be solved. For example, electronics signal fidelity issues are still observed in the noisy environment of downhole logging, especially when highly conductive formations are present. Further problems for induction logging tools are caused by the "skin effect." Skin effect causes a loss of proportionality between a received signal and formation conductivity, thereby making interpretation of signals from induction logging tools more complex. Conversely, very low conductivity rocks present accuracy problems for induction logging tools due to low signal-to-noise ratios. These problems are made more challenging when the beds or rock formations of interest are relatively thin.

Attempts to resolve these problems have exhibited shortcomings, including a high cost/benefit ratio. What is needed is a cost-effective, robust, electronics subsystem with a design centered on noise minimization/cancellation resulting in improvements in data signal fidelity and more accurate logging results.

BRIEF SUMMARY OF THE INVENTION

Pulse compression signal processing techniques and fast, high-resolution multi-measurements are used to improve the signal-to-noise ratio by modulating the waveform driving the transmitter and correlating the received signal with the transmitted signal. For the source of radiation, a digital highly-phase-stable, low-distortion sine wave generator/power amplifier for energizing a differentially driven single transmitter coil, parallel-tuned to desired frequencies at selected amplitudes and repetition rates, is disclosed. The transmitter coil induces current flow into the formations around the wellbore.

To measure induced current from the formation, several mutually balanced fully differential receiver coils, located at different distances from the transmitter, are coupled to a wideband, low-noise, receiver-amplifier signal chain using a preamplifier/amplifier section, followed by signal processing blocks that include a selective bandpass filter/phase sensitive detector section, and a high-sampling-rate 24-bit ADC converter controlled by a high-speed microcontroller. All receivers are accessed, calibrated and synchronized in parallel by a real-time processor that collects data, drives the tool and communicates with the telemetry system.

BRIEF DESCRIPTION OF THE SEVERAL VIEWS OF THE DRAWING(S)

DETAILED DESCRIPTION OF THE INVENTION

Figure 1:
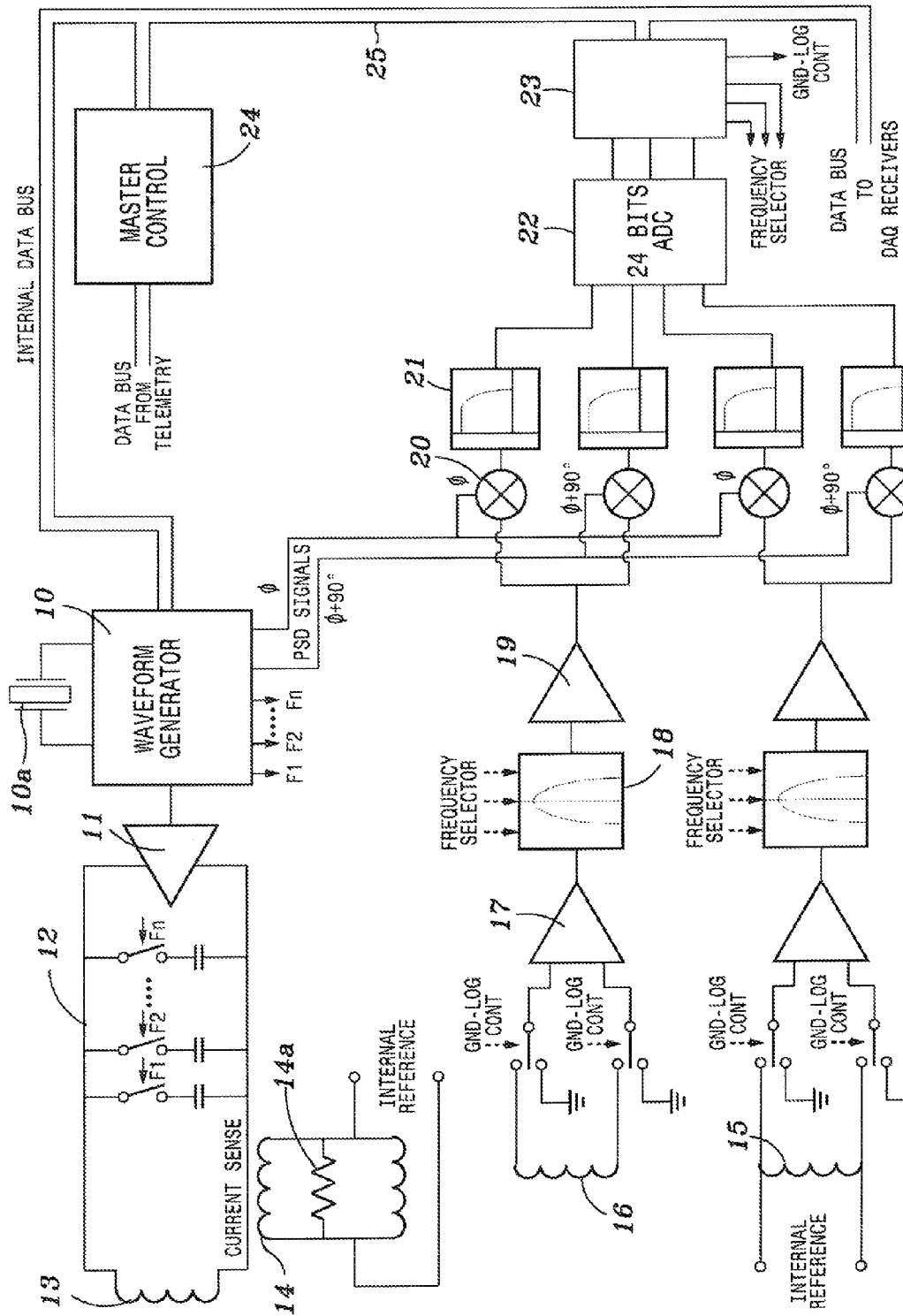
FIG. 1 shows a general system architecture block diagram of the downhole electronic section.
Figure 2:
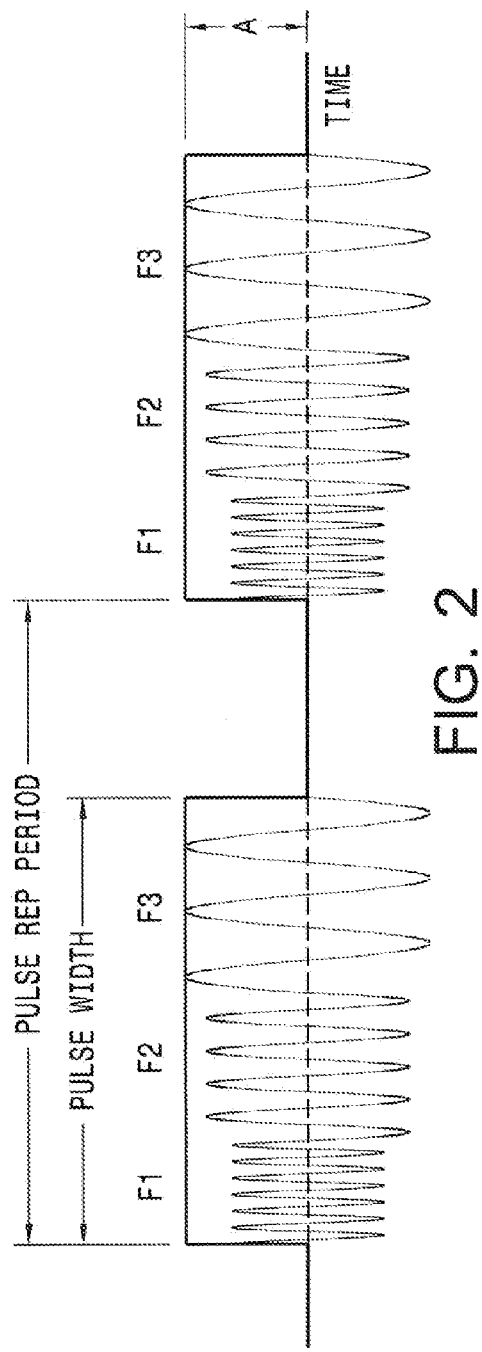
FIG. 2 shows a typical multi-frequency pulse width and pulse repetition period.

The logging tool electronics disclosed herein is for an array induction tool composed of five receivers and one transmitter coil, but could be used for different topologies with a different number of transmitter/receiver coils. The receivers are preferably used in pairs, with one coil "bucking" the other (the coils are wound in opposite directions). The formation is radiated with the generated magnetic field produced by a highly-configurable digital waveform generator/transmitter driver/power amplifier section (the transmitter signal stimulus section), as illustrated in FIG. 1, with pulse compression signals, as illustrated in FIG. 2. Waveform generator 10 and amplifier 11 are preferably a digitally controlled, highly-phase stable, low distortion sine wave generator and power amplifier. They energize parallel-tuned differentially driven transmitter coil 13 at a single frequency or in a frequency sweep mode (chirp) for multi-frequency operation. The phase accuracy of generator 10 and the temperature stability of master clock 10a are designed for stability over a broad range of wellbore temperature. The apparatus generates a steady-state sinusoidal pulse of amplitude (A) at each frequency. The amplitudes (A) at each frequency may be independently controlled. The carrier frequencies (16 KHz, 24 KHz and 32 K Hz, for example) are truncated by the pulse width, or a pulse compressed magnetic field. The transmitter current is sensed by coil 14 and read by voltage across resistor 14a, which serves as an internal reference.

The pulse width, as illustrated FIG. 2, may be 50 milliseconds. The enveloped sinusoidal pulses at three frequencies (pulse compression) achieve different depths of investigation. Eddy currents generated in the formation are detected using receiver coils 16 (FIG. 1) located at different distances from the transmitter coil. A highly-configurable receiver signal chain, consisting of receiver coils 16, amplifier 17, band-pass filter 18 and amplifier 19, processes in-phase (zero phase difference with transmitter current) and quadrature (90 degrees out of phase with transmitter current) components, as shown at 20 and 21. The signal is then digitized, preferably using 24-bit A/D conversion technology (signal measurement section), as illustrated at 22. The measured eddy currents in the formation indicate the formation resistivity. Using adaptive algorithms under firmware control, reconfigurable stimulus and measurement components are controlled. Adaptive algorithms can be stored in a computer-readable medium in downhole hardware in the housing of a logging tool or in surface hardware. The downhole system disclosed herein is well suited for use of adaptive algorithms to set stimulus and measurement components in accord with optimum operating conditions of the system as determined by the algorithms. Adaptive algorithms for optimization are well known. Frequency is selected and control of ground and logging configuration are achieved at 23, under control of master control 24. A data bus from telemetry is connected to the input of master control 24 and signals from the master control are put on an internal data bus to receivers.

Figure 3:
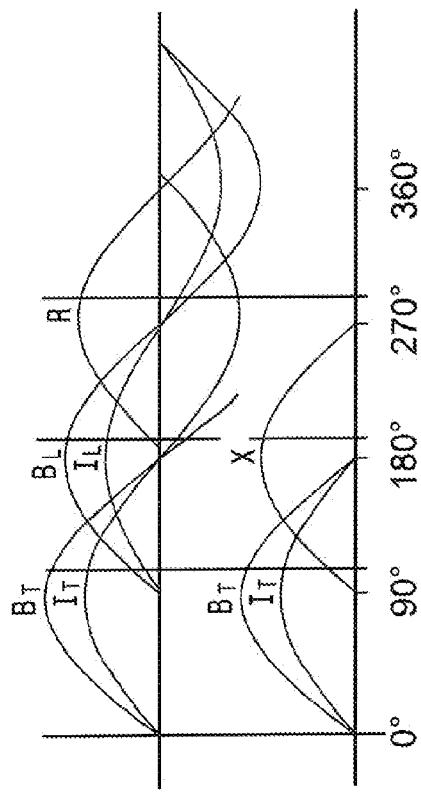
FIG. 3 illustrates the phase differences of the electrical currents, magnetic field and voltage.

FIG. 3 illustrates the phase angles of the signals and responses, where:

$B_T$=transmitter magnetic field,
$I_T$=transmitter current,
$I_L$=formation current "ground loop,"
$B_L$=formation current "ground loop" magnetic field,
R=in-phase receiver DAQ (Digital Acquisition) voltage component due to formation conductivity, and
X=quadrature phase receiver voltage component due to formation skin effect.

The formation "ground loop" current flows around the induction tool due to coupling with the magnetic field generated by the transmitter. Formation conductivity is determined by the formation ground loop current, which generates a secondary magnetic field, that couples a signal into the receiver array that is an indicator of formation conductivity (or inversely, resistivity). Current flow in the transmitter coil establishes the primary (reference) magnetic field generated by the transmitter.

The ratio of the sensed X-signal with respect to the R-signal at the receiver coil for a high performance auto-shielded induction tool can be around 10:1 in conductive formations and boreholes, so digitized R-signal (in phase) formation data is the signal of interest in low-conductivity formations, and quadrature X is used for calibration, skin effect correction and in special processing algorithms in high-conductivity environments.

The transmitter signal stimulus section generates the magnetic field, driving controlled pulsing current at transmitter coil 13. The transmitter and selected capacitors create tuned tank 12, which functions according to the equation:

$$f = 1/2\pi\sqrt{LC}$$

where f is the operation frequency, L the transmitter inductance, and C is the capacitance of a variable capacitor controlled by firmware. The electronics, switching frequency and capacitors are preferably selected every 10 mS, and the pulse frequency of operation is adjustable by firmware from 1K to 32 KHz.

The receiver coil measurement signal chain DAQ system, (16, 17, 18, 19, 20, and 21) shown in FIG. 1 measures the auto-induced signals and apparent conductivity using a phase-sensitive detector based on square wave reference signals auto-generated in the stimulus section. The DAQ reconfigures the bandpass filters per frequency, grounds the receiver front end and measures ground and a reference channel periodically to calibrate downhole, as will be explained below.

All R and X signals from five receivers and calibration signals are collected in parallel in real time and may be used to correlate and calculate the real conductivity point-by-point up-hole (on the surface). Master processor 24 drives the tool operation and collection of data using a widely-used industrial network bus, discussed below.

The tool is designed to operate over the industrial network bus, transmit data up to 1 M bit and support up to 32 nodes. This structure provides the flexibility to manage different kinds of induction tools, with multiple transmitters and multiple receivers, and be adjustable in frequency or capable of sweeping frequencies. In the design discussed here, the tool includes five receivers (five pairs of receivers, main (+) and bucking (−) in series at each spacing), one transmitter and it has three operating frequencies. This tool also supports the connection of several kinds of sensors and actuators, only needing an address and firmware to be accessed by the master processor. Each module connected to the data buss (MUX, RECEIVERS, CONTROL and TRANSMITTER) has reconfigurable, auto-calibration, and auto-test features that make for adjustable and adaptable electronics for several kinds of tools, topologies, and configurations.

This multicore architecture was developed to minimize system stability issues, allowing every module enough autonomy to improve signal measurement dynamic range (for low conductivity formation by over-sampling the point in order to reduce the noise and get better data) and scale power consumption with sampling frequency, which is particularly important in newer tool designs using lower power supply voltage components. Recent developments in adaptive (reconfigurable) systems and the use of higher sampling rate ADC's are combined to provide this robust high-speed architecture not available in previous systems.

These features enable electronics with the capability to avoid high and long transients in the stimulus section, permit sweeping in multiple frequencies (while keeping the same depth of investigation of previous systems) and the capability to use several receivers. Faster sampling allows the system to have higher resolution in thin bed high-definition logging.

Generically, array induction tool measurement systems are performance limited due to the difficulty in configurability to a wide variety of analog circuit requirements. A highly-programmable analog system that can be configured for arbitrary analog functionality is quite valuable. This includes the tool's ability to sweep in frequency, switching capacitors at the transmitter, selecting frequency of operation at the receivers, reconfiguring resistors to adjust gain, and changing ADC resolution according to operation frequency and data from formation resistivity. Highly programmable analog systems can be used as the analog core of software defined measurement systems and also be valuable in fast prototyping tool applications. Since subsurface induction tools usually have various serial bus protocols for telemetry, a dependable system with flexibility to adapt easily to various protocols adds additional value to the system.

Referring again to FIG. 1, generator 10 generates both sine wave and square wave signals. Generator 10 also provides reference signals for PSD (Phase Sensitive Detector) 20 operation, both in-phase and quadrature. Parallel tuning bank capacitors 12, permitting the reconfiguration of the hardware needed by software to run at different frequencies, output the desired frequencies at selected amplitudes and repetition rates for energizing differentially driven single transmitter coil 13. Intelligent edge-rate control techniques are integrated into the transmitter driver design to minimize the effect of parasitic capacitance and resistance, manage EMI generation, minimize distortion, and still maintain high efficiency and optimal signal-to-noise ratio (SNR). This results in an electronics topology that is less sensitive to noise. To monitor current stability, a voltage is applied across internal reference 15 to account for electronic drifts with temperature.

Signals from the formation are sensed by a mutually balanced, fully differential sensor-receiver coil system 16 and are amplified by an ultra-low noise preamplifier, which is coupled to selectable cut-off frequency bandpass filter 18, which is synchronized with the frequency of operation. The signals are then amplified again by amplifier 19 and passed to phase-sensitive detector 20 to lock-in to the frequency of interest using the square wave reference signals coming from generator 10. PSD 20 separates the auto induced signals X from the signals sensed from the formation R. Then, low pass filter 21 at the PSD output generates the DC voltage of both signals X and R. High sampling rate 24-bit ADC 22 with parallel channels then converts the signals to digital data. ADC 22 is controlled by high-speed microcontroller 23 and sends the data to master control 24 through high-speed communication data bus 25.

Figure 4:
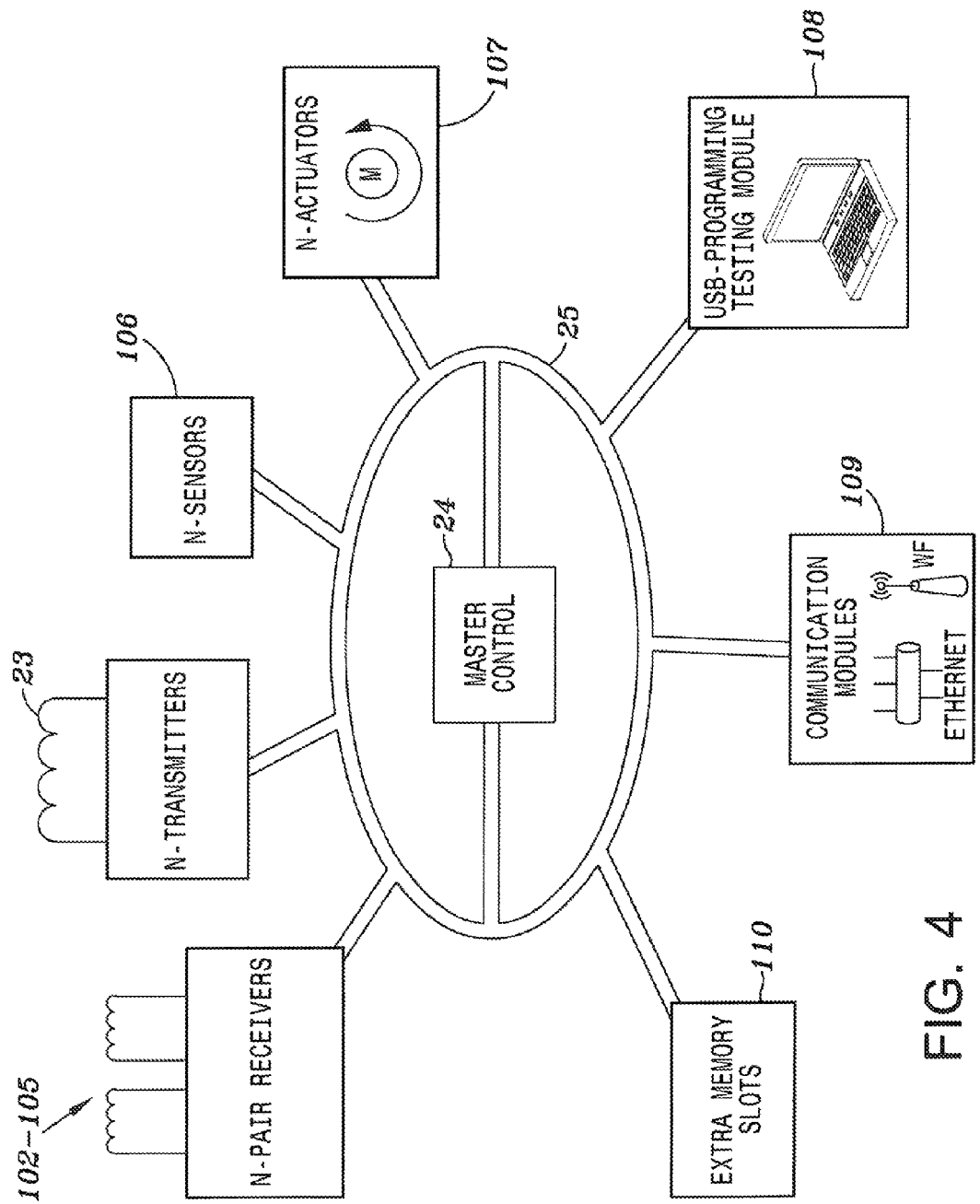
FIG. 4 shows the system architecture with optional features.

Referring to FIG. 4, the Thin Bed Induction (TBI) tool disclosed herein is preferably composed of N pairs of receivers 101-105 (when there are five pairs of receivers) and one extra channel (from coil 15, FIG. 1) for internal calibration purposes (to sense the transmitter current and detect electronics drift). Additional receivers 106 may be added. All receiver sensors are placed in pairs, as discussed above. (Only one coil is shown in the figure, for clarity). The tool may perform multiple ADC conversions in parallel, independent of the number of receiver coils or sensors on the bus. The tool is capable of driving from the master the signals from two to N transmitters in one sample cycle—in real time. If more than one transmitter is used, it may be in a separate tool. This feature gives the logging tool disclosed herein a flexible architecture that can handle dense, complex information in short frame times. This capability increases precision, resolution, and data correlation in thin-bed logging.

Measured signals are sent to master control 24 through data bus 25 (FIG. 4). Master control 24 drives the logging tool, saves the data from receivers 102-105, synchronizes information between boards and receivers, receives commands from up-hole through communication modules 109 and sends data to communication modules 109.

Additional sensors 106 and actuators 107 may be included in the system. The sensors may be a mud sensor or accelerometer, for example. The actuator may operate a motor, for example. The system may include USB programming testing module 108 and extra memory slots 110. It is reconfigurable and flexible enough to drive multiple receivers, multiple transmitters, and multiple frequency induction systems. The flexible architecture of the system may use several communication protocols and internal buses, such as I2C, RS485, CAN, USB, and TCP/IP.

The disclosed system may be driven and accessed through the I2C data bus by a telemetry system such as disclosed in U.S. patent application Ser. No. 13/267,313, filed Oct. 6, 2011, or through other commercial telemetry systems. The system preferably sends commands and receives raw data from all receivers every 50 mS in logging mode and every 500 mS in calibration mode, for all interpretation and calculation algorithms used up-hole in a surface logging unit.

Figure 5:
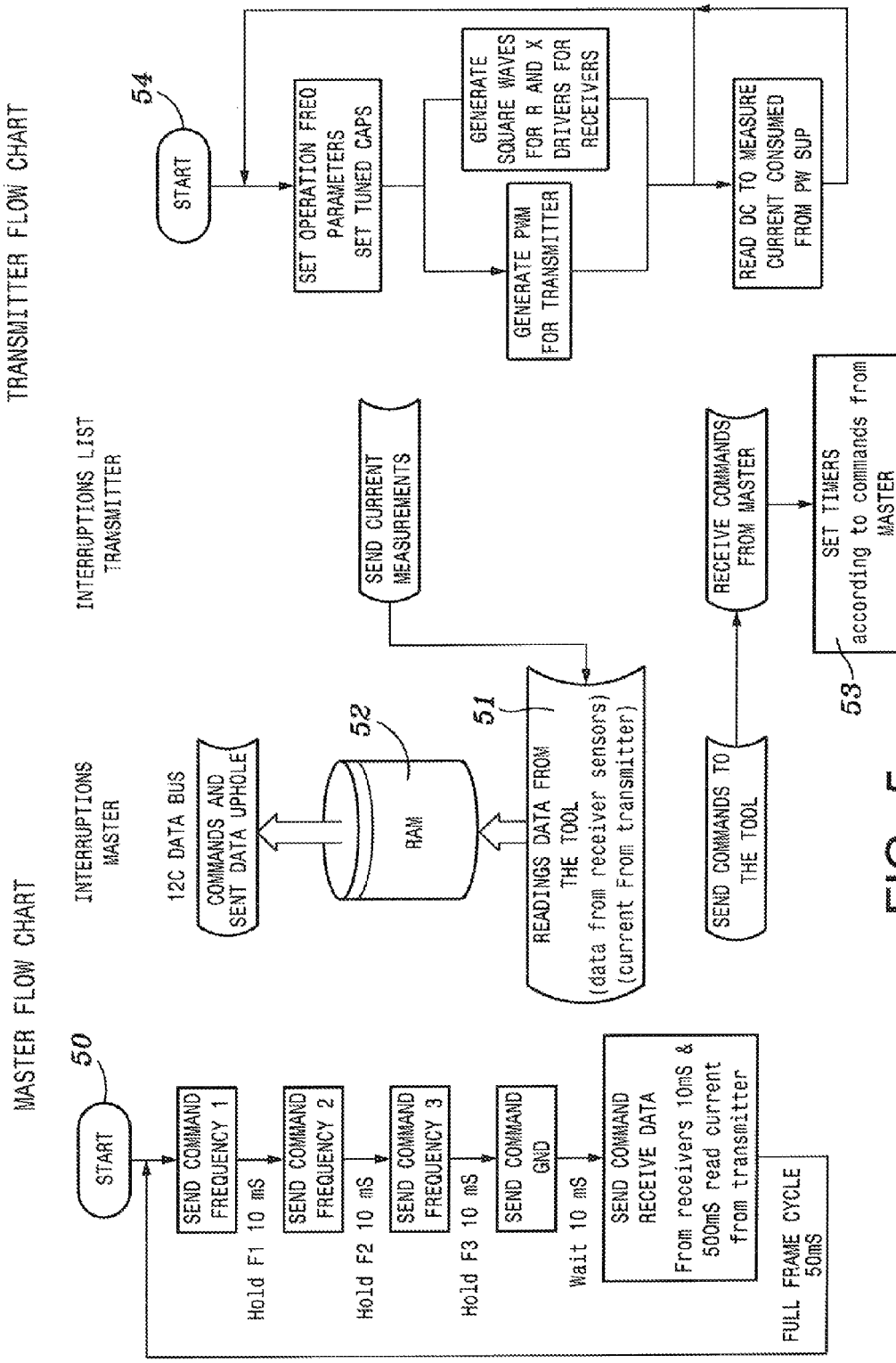
FIG. 5 shows the system control firmware flowchart.

FIG. 5 shows a master flow chart and a transmitter flow chart for signals used in operation of the logging tool. A series of commands begins at 50 for sending different frequencies in succession to transmitters—for example, for 10 mS at each frequency, and receiving data from receivers. These values may be varied by software. In the example, the commands are: send frequency F1 for 10 mS, then send frequency F2 for 10 mS, then send frequency F3 for 10 mS, then ground the circuits for 10 mS, then send acquired data to the master controller in 10 mS, then begin a new cycle. Thus, the cycle time is 50 mS. The current from the transmitter (internal reference) is read every 500 mS, or 10 cycles. Data from receivers and the internal reference signal (current from the transmitter) are received at 51 and stored in RAM 52. The stored data are then sent uphole in response to a command from the master controller. Timers are set in response to commands from the master controller at 53. At 54 a sequence is started to set operational frequencies by setting tuned capacitors, generate PWM (Pulse Width Modulation) for transmitters, generate square waves and read the ADC (Analog to Digital Converter) to measure current consumption from the power supply.

Although the present invention has been described with respect to specific details, it is not intended that such details should be regarded as limitations on the scope of the invention, except to the extent that they are included in the accompanying claims.

What is claimed:

1. Apparatus for measuring electrical conductivity of a rock formation surrounding a wellbore, comprising:
 a housing adapted for operation of electronic apparatus in a wellbore;
 means for generating a linear amplitude modulated multi-amplitude sine wave at variable amplitudes enveloped within pulse compressed time intervals and pulse widths, wherein a phase accuracy of electronic circuits for generating sine wave and pulse signals is designed for stability over a range of wellbore temperatures;
 a differentially driven transmitter coil disposed at a selected location on the housing connected for receiving and transmitting the signals from the first electronic circuits;
 a plurality of mutually balanced fully differential receiver coils disposed at selected locations on the housing, each coil connected to second digitally-controlled electronic circuits for amplifying and filtering signals from the receiver coils;
 a phase-sensitive detector and low pass filter for receiving signals from the second electronic circuits and the first electronic circuits and producing in-phase and quadrature out-of-phase signals as an analog signal; and
 an analog-to-digital converter to process the analog signal and produce a digital signal for transmission.

2. The apparatus of claim 1 further comprising a current sensor in the first electronic circuits for sensing current to the transmitter coil and sending a signal to an electronic circuit, the electronic circuit including a phase-sensitive detector and low pass filter for receiving signals from the current sensor and providing an internal reference signal.

3. The apparatus of claim 1 wherein the receiver coils are accessed, calibrated and synchronized in parallel by a real-time processor that collects data, drives the tool and communicates with a telemetry system.

4. The apparatus of claim 3 wherein the receiver coils are accessed, calibrated and synchronized in parallel by a real-time processor in a selected cycle time.

5. The apparatus of claim 1 further comprising sensors under control of the controller.

6. The apparatus of claim 1 wherein the phase-sensitive detector is based on square wave reference signals generated in the first digitally-controlled electronic circuits for generating sine wave and pulse signals.

7. The apparatus of claim 1 wherein the apparatus includes five pairs of receivers, each receiver having main and bucking coils in series.

8. The apparatus of claim 1 wherein the sine wave signals are generated at three amplitudes sequentially.

9. The apparatus of claim 1 further comprising a second transmitter coil, which may be in a separate tool.

10. Apparatus for measuring electrical conductivity of a rock formation surrounding a wellbore, comprising:
   a housing adapted for operation of electronic apparatus in a wellbore;
   means for generating a linear multi-frequency and amplitude modulated multi-frequency and multi-amplitude sine wave at variable frequencies and amplitudes enveloped within pulse compressed time intervals and pulse widths, wherein a phase accuracy of electronic circuits for generating sine wave and pulse signals is designed for stability over a range of wellbore temperatures;
   a differentially driven transmitter coil disposed at a selected location on the housing connected for receiving and transmitting the signals from the first electronic circuits;
   a plurality of mutually balanced fully differential receiver coils disposed at selected locations on the housing, each coil connected to second digitally-controlled electronic circuits for amplifying and filtering signals from the receiver coils;
   a phase-sensitive detector and low pass filter for receiving signals from the second electronic circuits and the first electronic circuits and producing in-phase and quadrature out-of-phase signals as an analog signal; and
   an analog-to-digital converter to process the analog signal and produce a digital signal for transmission.

11. The apparatus of claim 10 further comprising a current sensor in the first electronic circuits for sensing current to the transmitter coil and sending a signal to an electronic circuit, the electronic circuit including a phase-sensitive detector and low pass filter for receiving signals from the current sensor and providing an internal reference signal.

12. The apparatus of claim 10 wherein the receiver coils are accessed, calibrated and synchronized in parallel by a real-time processor that collects data, drives the tool and communicates with a telemetry system.

13. The apparatus of claim 12 wherein the receiver coils are accessed, calibrated and synchronized in parallel by a real-time processor in a selected cycle time.

14. The apparatus of claim 10 further comprising sensors under control of the controller.

15. The apparatus of claim 10 wherein the phase-sensitive detector is based on square wave reference signals generated in the first digitally-controlled electronic circuits for generating sine wave and pulse signals.

16. The apparatus of claim 10 wherein the apparatus includes five pairs of receivers, each receiver having main and bucking coils in series.

17. The apparatus of claim 10 wherein the same wave signals are generated at three amplitudes sequentially.

18. The apparatus of claim 10 further comprising a second transmitter coil, which may be in a separate tool.

* * * * *